United States Patent

[11] 3,614,635

[72] Inventors Anthony N. LaPine
San Jose;
Julian E. Vaughn, Campbell, both of Calif.

[21] Appl. No. 889,442

[22] Filed Dec. 31, 1969

[45] Patented Oct. 19, 1971

[73] Assignee International Business Machines Corporation
Armonk, N.Y.

[54] VARIABLE FREQUENCY CONTROL SYSTEM AND DATA STANDARDIZER
5 Claims, 5 Drawing Figs.

[52] U.S. Cl. ........................................................ 328/155, 331/17, 331/1 A, 328/175, 307/233

[51] Int. Cl. ........................................................ H03b 3/04

[50] Field of Search ........................................... 328/155, 166, 175, 215; 307/231, 232, 233; 331/17, 25

[56] References Cited

UNITED STATES PATENTS

| | | | |
|---|---|---|---|
| 3,185,938 | 5/1965 | Pelose | 331/25 |
| 3,259,851 | 7/1966 | Brauer | 331/25 |
| 3,286,188 | 11/1966 | Castellano | 328/155 |
| 3,328,719 | 6/1967 | DeLisle et al. | 331/17 |
| 3,337,813 | 8/1967 | Graeve | 331/17 |
| 3,337,814 | 8/1967 | Brase et al. | 328/155 |
| 3,351,868 | 11/1967 | Farrow | 331/17 |
| 3,383,619 | 5/1968 | Naubereit et al. | 331/17 |
| 3,458,823 | 7/1969 | Nordahl | 328/155 |

*Primary Examiner*—Donald D. Forrer
*Assistant Examiner*—R. E. Hart
*Attorneys*—Hanifin and Jancin and Wm. J. Kopacz

ABSTRACT: A variable frequency oscillator feedback control system performs a frequency control function and a data relocation function. The oscillator is made to follow the frequency of random input data and individual incoming data pulses are relocated in time to correspond with the time slots defined by the oscillator output pulses. The feedback loop contains a novel DC logic phase comparator and data standardizer. The phase comparator controls the frequency of the oscillator while the data standardizer relocates the data pulses to the time slots of the oscillator pulses.

INVENTORS
ANTHONY N. LaPINE
JULIAN E. VAUGHN

BY *Wm. J. Kopacz*
ATTORNEY

VARIABLE FREQUENCY CONTROL SYSTEM AND DATA STANDARDIZER

RELATED APPLICATION

This invention is related to copending application Ser. No. 771,205, assigned to the same assignee, and entitled "Servo System for Data Processing Apparatus." In the previously filed patent application, there is described a system whereby random frequency incoming data controls the frequency of a variable frequency clock oscillator. In this prior system, the feedback loop contains a bistable multivibrator which is used to provide an indication of the phase difference between incoming data pulses and associated clock pulses.

Input data pulses in some systems have random frequencies; that is, the incoming data can undergo unexpected frequency shifts. In order that time coordination between the data and processing devices be achieved, it is necessary to have a source of pulses which corresponds in frequency to the frequency of the random incoming data. This source can be used to sequence the processing devices. To achieve the objective of timing coordination, it would be further necessary to assure that incoming data pulses be placed in the same time slot as the timing pulses. These two functions, namely frequency control and time relocation, are different and must be distinguished. The incoming data may have an overall frequency identical to the frequency of the timing oscillator but a particular data pulse may be slightly misplaced in time. That is, the data pulses may have some "jitter" which would cause timing irregularities if not corrected. A further problem is the fact that, even though the frequency of the data and the timing oscillator are the same, the data and the timing pulses can be out of phase with each other. This phase difference must be corrected.

SUMMARY OF THE INVENTION

The subject matter of this invention performs both of the above functions, that is, a variable frequency clock oscillator is made to follow the frequency of the random incoming data and the random incoming data pulses are placed in the precise time slots defined by associated clock oscillator pulses. The invention of the instant application resides in the use of fast DC logic as a phase comparator-data standardizer combination whereby not only is an indication of the relative phase difference between the incoming data pulses and the clock oscillator pulses obtained, but also the additional function of standardizing the data pulses to the time slots of the clock pulses is achieved.

According to the teachings of this invention, a closed loop control system for a variable frequency clock oscillator is provided wherein the feedback loop contains a novel data-clock phase comparator and data standardizer combination. Data pulses, which enter the loop at a certain random frequency, are compared with clock oscillator output pulses in the data-clock phase comparator. A data pulse enters the phase comparator circuit followed by a clock output pulse. The time lapse between the arrival of the data pulse and the arrival of the output clock pulse is measured by the data-clock phase comparator. So long as this lapse remains at a certain given constant, the system will be in a steady state condition, that is, the data is arriving at the same frequency at which the clock oscillator is pulsing. If the data-clock phase comparator measures a shortening of this time lapse, this is an indication that the data is arriving at a slower frequency than previously. The phase comparator will inform control logic circuitry of the data-clock phase difference decrease which will cause the logic circuitry to activate a negative current source. A pulse of negative current will be applied to the variable frequency clock oscillator causing the oscillator to decrease its output frequency. By the same token, should the random data pulses start to enter the system at an increased rate, that is, the time duration between the given output clock pulse and the given data pulse becomes larger, the data-clock phase comparator will cause the control logic to activate a positive current source. The positive current source will cause the variable frequency oscillator to increase its frequency. In this manner, the clock oscillator will follow the frequency of the random input data.

The data standardizer operates in conjunction with the data-clock phase comparator. As aforementioned, the time lapse between the arrival of a data pulse and the later arrival of an output clock pulse is measured by the phase comparator. This time lapse is not always constant due to the jittering of the data pulse. The data standardizer essentially performs the function of eliminating these differences in time lapses; the data standardizer holds the data pulse until the clock pulse appears and then releases the data pulse. In this manner, the incoming data pulse is applied to external processing devices with the jitter removed and with a fixed time relationship to the clock pulse.

It is therefore an object of this invention to provide a feedback control system for a variable frequency oscillator whereby the oscillator will follow the frequency of incoming random data.

It is a further object of this invention to provide logic circuit means whereby data can be relocated in time to correspond precisely with a reference timing signal.

It is a further object of this invention to provide a fast DC logic circuit capable of providing an indication of data-clock phase difference.

It is a further object of this invention to provide a means whereby data can be relocated in time to correspond precisely with a reference signal.

It is a further object of this invention to provide DC logic which is capable of indicating the phase difference between two pulses and of relocating one pulse in time to correspond to the time slot of the other.

DETAILED DESCRIPTION OF THE INVENTION

Figure 1:
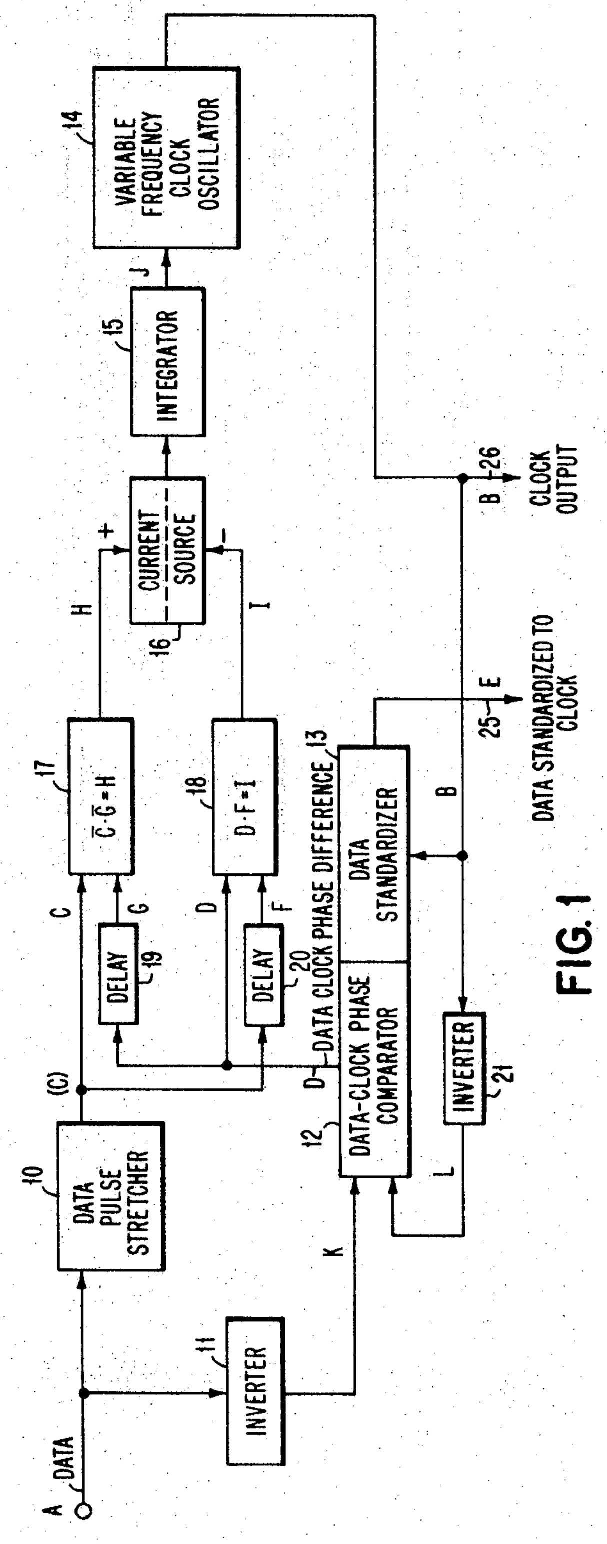
FIG. 1 is a block diagram of the variable frequency oscillator control system having a data-clock phase comparator and a data standardizer in the feedback loop.
Figure 2:
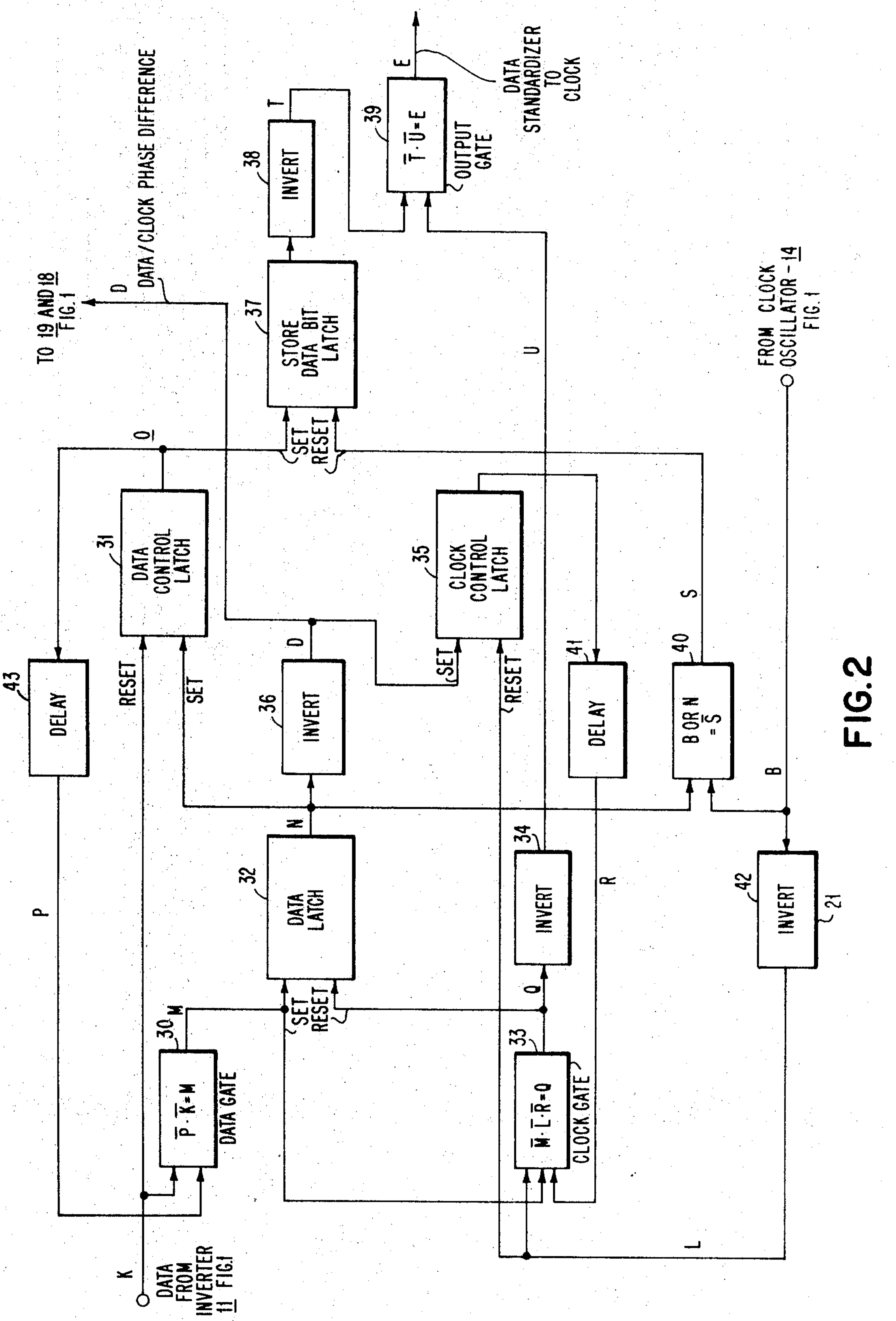
FIG. 2 is a block diagram of the data-clock phase comparator and data standardizer combination.
Figure 3:
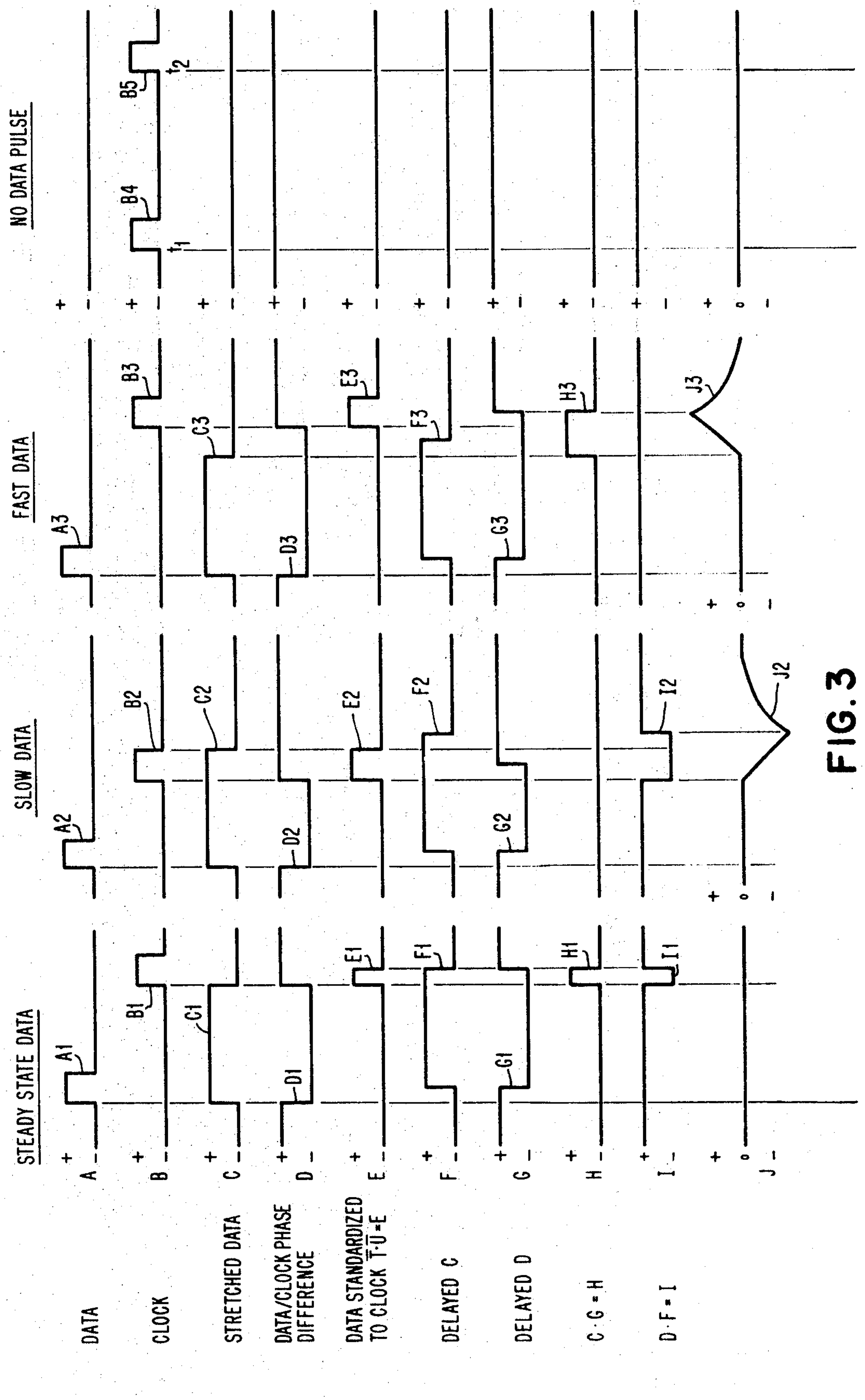
FIGS. 3 and 4 are pulse timing diagrams to be used in conjunction with the circuitry of FIGS. 1 and 2.
Figure 4:
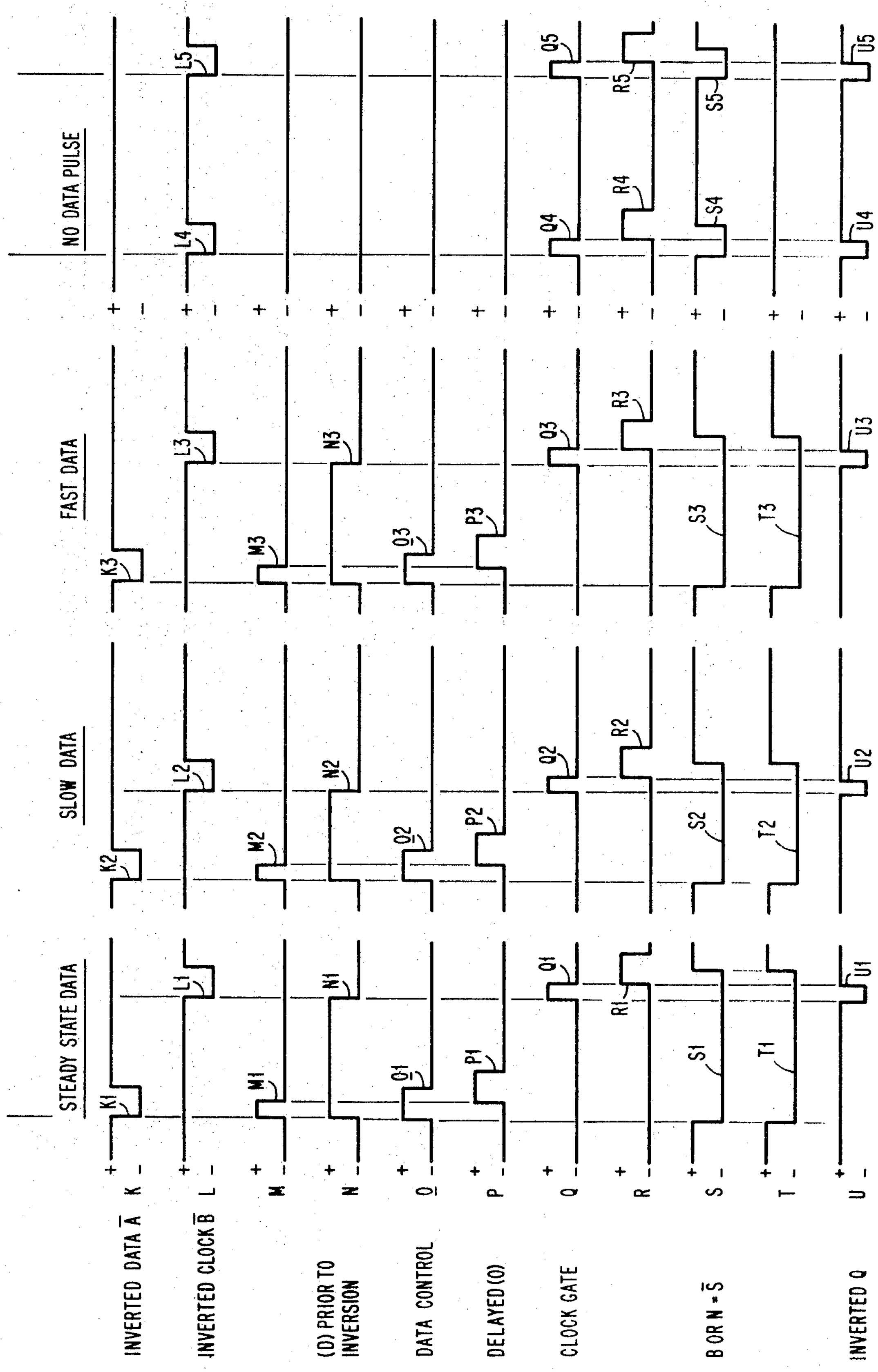

Reference will now be made to the apparatus shown in FIG. 1 together with the steady-state timing diagram of FIGS. 3 and 4. The steady-state condition, that is, that condition in which the rate of incoming data equals the frequency of the clock oscillator, is shown by the pulse relationships seen in column 1 of FIGS. F3 and 4. Data A is applied to data pulse stretcher 10 and through inverter 11 to data-clock phase comparator 12. The novel circuitry of data-clock phase comparator 12 and data standardizer 13 will be described in detail in connection with FIG. 2. Also applied to phase comparator 12 is the output of variable frequency clock oscillator 14 which output is inverted by inverter 21 prior to application to the comparator 12. The comparator 12 produces output D, which output represents the phase difference between the leading edge of input data pulse A1 (FIG. 3) and the leading edge of clock pulse B1. Data pulse stretcher 10, in response to the leading edge of data pulse A1, produces stretched data pulse C1. The duration of stretched pulse C1 is, to a degree, arbitrary; however, optimum results will be obtained if the stretched data pulse C1 is approximately half a clock cycle. In the steady-state condition, when the frequency of the clock and the frequency at which incoming data occurs is the same, stretched data pulse C1 will be precisely equal in duration to data-clock phase difference pulse D1. Difference pulse D1 is delayed in Delay 19 and, in the form of G1, applied together with pulse C1, to AND circuit 17. Similarly, pulse F1, which is pulse C1 delayed by delay 20, is applied to AND 18 together with pulse D1. When both pulse C1 and pulse G1 are in the down or negative position, AND 17 will produce a positive pulse output H1. On the other hand, when data pulse difference D is in the positive or up position and F is also in the up position, AND 18 will produce a negative going pulse I1. Since the time duration of positive going pulse C1 and negative going pulse D1 are the same and since they are delayed by equal amounts in delays 20 and 19 respectively, it will follow that pulse H1 and I1 will be identically placed in time and of opposite polarities. Pulses H1 and I1 are applied to current source 16, which can be of conventional design. Current source 16 is responsive to the difference in time durations of pulses H1 and I1. Since, in the steady-state condition, H1 and I1 are of equal durations, current source 16 applies no net current to integrator 15. Integrator 15 produces voltage J which is seen to be zero in the steady-state condition. The frequency of oscillator 14 will therefore remain the same.

It will be noted that even though the frequency of incoming data equals the frequency of timing oscillator 14, the position in time of data pulse A1 is not the same as timing pulse B1. In order that B1 be useful for timing purposes with respect to A1 it is necessary that these pulses occupy the same time slot. Data standardizer 13 performs the function of relocating data pulse A1 from its original time slot to the time slot of timing pulse B1. Relocated data A1, seen as E1, is emitted from standardizer 13 and fed together with timing output B1 to external processing circuitry.

The next case to be considered is the situation when the data is arriving late, that is, only shortly before the associated clock pulse. Referring to the second column of FIGS. 3 and 4 and to FIG. 1, data pulse A2 which arrives slightly late, is applied to stretcher 10 thereby producing pulse C2. Clock pulse B2 arrives a relatively short time after data pulse A2 and data-clock comparator 12 produces pulse D2 which is representative of the difference in time between the leading edge of the data pulse A2 and the leading edge of the clock pulse B2. Of course, C1 is equal to C2 in duration because the data pulse stretcher 10 produces the same length pulse regardless of the time at which the data pulse arrives. D2 is of a shorter duration than D1 because data pulse A2 is arriving late while data pulse A1 arrives on time. Stretched data pulse C2 will therefore be longer than difference pulse D2. Pulse C2 is delayed in 20 and applied in the form of F2 to AND 18. Similarly, pulse D2 is applied through delay 19 to AND 17 in the form of pulse G2. AND 17 will produce a positive output only during that time period when both the C and the G pulse trains are down or negative. In the slow data case (column 2 of FIGS. 3 and 4), trains C and G are never simultaneously down, therefore no positive H pulse will be produced by gate 17. AND 18 will produce a negative going pulse I2 which will be of a duration equal to time during which both D2 and F2 and in the up or positive position. As can be seen in FIG. 3, the net effect of pulse A2 arriving late is to cause pulse D2 to be shorter than pulse C2 which in turn causes pulse I2 to be of relatively long duration and H to remain down or negative. Since there is no H pulse, the positive portion of current source 16 will not be activated; on the other hand, pulse I2 will activate the negative side of source 16 causing the production of a negative current. This negative current will be integrated in integrator 15 thereby producing negative voltage J2. Negative voltage J2 will be applied to variable frequency clock oscillator 14 causing the clock oscillator 14 to slow down. Data standardizer 13 again functions to relocate the data pulse to the time slot defined by the clock pulse. Relocated data pulse E2 and timing pulse B2 proceed on to external circuitry via leads 25 and 26.

The third case to be considered is that of the data pulse which arrives too soon relative to the clock pulse; that is, the frequency of the random data input has increased. Random data pulse A3, (col. 3, FIG. 3) enters the system much earlier than clock pulse B3; the time duration between the time of arrival of A3 and the time of arrival of B3 is seen as pulse D3, which is produced by comparator 12. D3 is of greater duration than stretched data pulse C3 because, as aforementioned, the length of the C pulse is constant while the length of the D pulse depends on the time lapse between the data input and the clock output. As in the prior two cases, (the case of a steady-state data arrival condition and a late data arrival condition) the stretched data pulse C3 and the data-clock phase difference pulse D3 are compared in delay circuit 19 and 20 and AND gates 17 and 18. Pulse D3 produced by data-clock phase comparator 12 is applied to AND gate 17 through delay 20 in the form of delayed pulse G3 along with stretched data pulse C3. Stretched data pulse C3 is delayed by delay 20 and applied in the form of delayed pulse F3 to AND 18 together with difference pulse D3. AND gate 18 will produce a negative output pulse only when pulse trains D and F are both in the positive or up condition. Gate 18, therefore, produces no down pulse at all during the early data pulse arrival condition because pulse train D and pulse train F are never simultaneously in the up position. On the other hand, AND 17 will produce a positive going pulse equal in duration to the time during which pulse train C and pulse train G are both in the negative or down position. As can be seen in the timing diagram, the positive pulse produced by gate 17, H3, is of relatively long duration. The relatively long positive going pulse H3 is applied to the positive portion of current source 16, causing the current source to produce a positive current which is integrated in integrator 15. The integrated current is applied to the variable frequency clock oscillator in the form of pulse J3. Positive pulse J3 causes the clock oscillator to increase in frequency. The frequency of oscillator 14 will continue to be increased until the oscillator rate equals the data rate, i.e. until the steady-state condition is achieved.

The last situation to be considered is the case of no data pulse entering the system during the time period defined by leading edges of two successive clock pulses. This is the situation of a binary zero input. Since the absence of a pulse does not indicate a slowing of data frequency, the variable frequency oscillator 14 should not change frequency. An analysis of FIG. 3, Col. 4 shows that a binary zero will not slow oscillator 14. Clock pulses B4 and B5 enter data-clock phase comparator 12 while no data pulse enters stretcher 10 or comparator 12. Stretcher 10 produces no positive going output because it has received no input. Since the difference in phase between the data input and the clock input does not exist, no data-clock phase difference pulse is produced. Stretched data train C remains in the negative or down position and data clock phase difference train D remains in the positive or up position. Since data train C remains down, delayed C train, F, will similarly remain down. By the same token, since difference train D remains up, delayed D train, G, will also remain up. Pulse train H will therefore remain in the down position since pulse train G remains at all times positive. Pulse train I goes negative for a period equal to the time during which pulse train D and pulse train F are both up; pulse train I will therefore remain up because pulse train F remains negative. Current source 16 will not be activated by either the H or I trains; the frequency of variable clock oscillator 14 will therefore remain constant.

Figure 5:
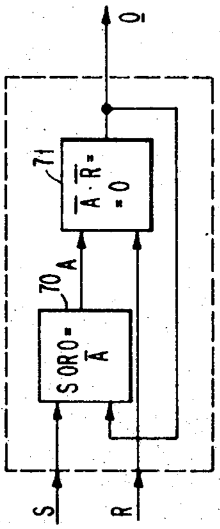
FIG. 5 is a diagram of a data latch of the type used in FIG. 2.

The above-described operations point out the manner in which variable clock oscillator 14 responds to and follows the frequency of the arriving data. The manner in which difference pulse D is produced and the manner in which the data is standardized to the clock pulse will now be described with reference to FIG. 2. As has been pointed out, difference train D and standardized data E are produced by comparator 12 and standardizer 13 (FIG. 1). FIG. 2 shows the structure of the comparator-standardizer combinations. The comparator is made up of data latch 32, data control latch 31, clock control latch 35, clock gate 33, and data gate 30. The standardizer comprises store data bit latch 37, output gate 39 and OR gate 40. Before describing the operation of the comparator-standardizer combination, a short summary of the operation of the particular type of latch used will be presented. FIG. 5 shows a latch which will produce a positive or up output in response to a positive signal at S and a negative signal at R. Output O will remain up until a positive pulse is applied to reset R. The latch is of conventional construction except for the fact that negative logic is used. The OR gate 70 produces a negative output if a positive input is impressed at either of the "in" terminals. AND 71 will produce a positive output if both of its "in" terminals have impressed thereon negative signals. Latches 31, 32, 35, and 37 of FIG. 2 are constructed in accordance with FIG. 5.

The operation of the data-clock phase comparator 12 and the data standardizer 13 will now be described with reference to FIGS. 2 and 4. FIG. 4, as FIG. 3, shows four data states: steady-state, slow, fast, and no data pulse. The first situation to be considered is the steady-state condition, that is, that condition which exists when the random data entering the system is at the same frequency as the clock oscillator. As has been mentioned in connection with FIG. 1, a data pulse enters the system and is inverted and applied in the form of pulse train K to the data-clock phase comparator. Inverted data pulse K1 is applied to data gate 30 which gate will produce a positive output pulse M only when both inputs are negative. It must be assumed, initially, that all latches 31, 32, 35 and 37 are in the reset condition. Since data control latch 31 is reset, its output O will be down, and therefore P will be down. Inverted data pulse K1 and train P therefore cause data gate 30 to pass positive pulse M1, which pulse will set data latch 32 causing latch 32 to produce positive going pulse 1 Pulse N1 is applied to the set input of data control latch 31 causing latch 31 to produce positive going pulse O1. O1 is applied through delay 43 to the input of data gate 30 in the form of delayed pulse P1. Since pulse P1 is positive, it will cut off data gate 30 causing the output of data gate 30, pulse M1, to terminate. Clock gate 33 can be enabled only if pulse train M is negative. Therefore, the termination of pulse M1 allows clock gate 33 to pass a positive going pulse Q1 when negative going clock pulse L1 appears. (The initial assumption that all latches are in the reset condition assures that pulse train R will be negative.) When clock pulse L1 appears, it will therefore be passed by clock gate 33 in the form of positive going pulse Q1. Q1 will be applied to the reset terminal of data latch 32 thereby causing the output of the latch, pulse N1 to terminate. Data latch output N1 is inverted in inverter 36 so as to produce output pulse D1 (FIG. 3) which represents the data-clock phase difference. Phase difference pulse D1 is applied to the circuitry of FIG. 1 in the manner aforedescribed. When data latch output N1 terminates, phase difference pulse D1 similarly terminates, that is, phase difference train D goes positive. Positive train D, which is applied to the set terminal of clock control latch 35 causes clock control 35 to produce positive going pulse R1 which is slightly delayed in delay 41 before being applied to clock gate 33. It will be noted that so long as no clock pulse L1 exists, clock control latch 35 will not be set; the output of clock control latch 35 will therefore be negative so long as train L is positive. This assures that clock gate 33 is enabled with respect to R train.

Random data pulse K1 is to be standardized to clock pulse L1, that is, placed in the same time slot as clock pulse L1. The production of pulse O1 by latch 31 has been previously described. Pulse O1 is applied to store data bit latch 37 thereby setting latch 37. The output of latch 37 is inverted by inverter 38 and is applied, in the form of negative going pulse T1, to output gate 39. Pulse Q1 (the production of which has been described) is inverted by inverter 34 and applied in the form of pulse U1 to output gate 39. The coincidence of negative going pulse T1 and negative going pulse U1 to the input of gate 39 causes pulse E1 (FIG. 3) to be produced. Pulse E1 is the data standardized to the clock.

The above-described operation presupposed that all the latches were in a reset condition at the time when inverted data pulse K1 entered data gate 30. The manner in which the reset function occurs will now be described. Data control latch 31 is reset when data pulse K1 disappears, that is, goes positive. The resetting of data control latch 31 causes pulse O1 to go negative and, after a slight delay caused by 43, P1 similarly goes negative. The disappearance of pulse P1 conditions data gate 30 to pass the next negative going data pulse. Clock control latch 35 produces a positive output when phase difference train D goes positive as has been aforementioned. This positive output after a slight delay in delay 41 is seen as pulse R1. When the clock pulse L1 disappears or goes positive, clock control latch 35 will be reset thereby causing pulse R1 to go negative. Stored data bit latch 37 is reset when neither clock pulse train B (FIG. 3) nor train N is positive. Train N will be positive during the time between the commencement of data pulse A and clock pulse B. Train N goes negative when clock pulse B appears. However, store data bit latch 37 will not be reset until clock pulse B disappears or goes negative. Thus, all of the latches are reset and prepared for the next data pulse to appear.

The functions performed by the data clock phase comparator and the data standardizer respectively are the same whether the input data be steady state, slow or fast. As can be seen in the fast and slow data columns of FIG. 4, pulse train N accurately represents the time lag between input data and the clock pulse. As in the steady-state case, pulses N2 and N3 commence when inverted data pulses K2 and K3 appear and cease when clock gate pulses Q2 and Q3 reset data latch 32. Similarly, inverted Q train, U2 and U3, enable output gate 39 to read out the stored data bit in latch 37 thereby standardizing the data to the clock. As in the steady-state data case, the system automatically resets itself to prepare for the next incoming data pulse.

In the no data case, that is, when no data pulse appears between the leading edge of one clock pulse and the leading edge of the next clock pulse, the E-train (FIG. 3) will remain down since there is no data pulse to be standardized. No E pulse appears because store data bit latch 37 is never set since data control latch 31 is never set. The reason data control latch 31 remains unset is because no inverted data pulse K passes through data gate 30 to set data latch 32. Clock pulse L5 enters the system producing pulse Q5, and pulse Q5 is applied, in the form of pulse U5, to output gate 39. Since output gate 39 has a positive T train applied thereto, no E train output will be produced by 39 in response to U5.

While the invention has been particularly shown and described with reference to a preferred embodiment thereof, it will be understood by those skilled in the art that various changes in the form and details may be made therein without departing from the spirit and scope of the invention.

What is claimed is:

1. Apparatus for maintaining time correspondence between a data pulse and a variable frequency oscillator output pulse comprising:
- means for determining the phase relationship between said data pulse and said oscillator pulse;
- means responsive to said determining means for varying the frequency of said oscillator; and
- data standardizer means, responsive to said determining means, for placing said date pulse and said oscillator output pulse into time correspondence;
- wherein said determining means and said date standardizer means comprise:
- latch means for initiating a phase difference pulse in response to said data pulse, and for terminating said difference pulse in response to said oscillator output pulse;
- means for storing said data pulse; and
- means connected to said storing means for reading out said data pulse in response to said oscillator output pulse;
- said date standardizer means being responsive to said phase difference pulse.

2. In a feedback control system having a variable frequency oscillator providing an output pulse, the combination of:
- a data pulse stretcher responsive to an input data pulse;
- a data clock phase comparator responsive to said data pulse;
- means for comparing the output of said data pulse stretcher and said phase comparator;

current source means connected to said comparing means, said variable frequency oscillator being responsive to said current source means, and said data clock phase comparator being responsive to the output of said oscillator;

data standardizer means connected to said phase comparator and the output circuit of said oscillator, said data standardizer means comprising:

latch means for initiating a phase difference pulse in response to said date pulse, and for terminating said difference pulse in response to said oscillator pulse;

means for storing said data pulse; and means connected to said storing means for reading out said data pulse in response to said oscillator output pulse.

3. In a feedback control system having a variable frequency oscillator providing an output pulse;

means for producing a reference pulse in response to an input data pulse;

means for producing a difference pulse indicative of the phase relationship between said data pulse and the output pulse of said oscillator;

means for comparing said reference pulse and said difference pulse;

said comparing means being connected between said reference pulse producing means and said difference pulse producing means;

means responsive to said comparing means for altering the frequency of said oscillator;

means responsive to said difference pulse producing means for storing said data pulse; and means responsive to said oscillator output pulse for reading said data pulse from said storing means.

4. A system according to claim 3 wherein said reference pulse producing means produces a pulse of constant duration and said difference pulse producing means produces pulses of variable duration.

5. A system according to claim 3 wherein said difference pulse producing means includes a data latch responsive to said input data pulse and said oscillator output pulse, and said storing means includes a store data bit latch responsive to said data latch and said oscillator output pulse.